United States Patent
Sailer et al.

(10) Patent No.: US 10,814,746 B2
(45) Date of Patent: Oct. 27, 2020

(54) ROTATABLE SEAT CONFIGURATION WITH MULTI-USE TABLE

(71) Applicant: HONDA MOTOR CO., LTD., Minato-ku, Tokyo (JP)

(72) Inventors: Michael T. Sailer, Whittier, CA (US); Nathan G. Brown, Long Beach, CA (US); Katie C. Wallace, Long Beach, CA (US); Mariko K. Schimmel, Rancho Palos Verdes, CA (US); Michelle Lee, San Francisco, CA (US); Camden Foley, San Francisco, CA (US); Alyson Yamada, Brooklyn, NY (US); Danny Stillion, San Carlos, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 88 days.

(21) Appl. No.: 16/222,736

(22) Filed: Dec. 17, 2018

(65) Prior Publication Data

US 2020/0189418 A1 Jun. 18, 2020

(51) Int. Cl.
*B60N 2/01* (2006.01)
*B60N 3/00* (2006.01)
(Continued)

(52) U.S. Cl.
CPC .......... *B60N 2/012* (2013.01); *B60N 2/0244* (2013.01); *B60N 2/062* (2013.01); *B60N 2/14* (2013.01);
(Continued)

(58) Field of Classification Search
CPC ...... B60N 2/012; B60N 2/062; B60N 2/0244; B60N 2/14; B60N 3/001; B60R 11/0235; B60R 2011/0085; B62D 63/04
See application file for complete search history.

(56) References Cited

U.S. PATENT DOCUMENTS 4,026,379 A * 5/1977 Dunn .................... B60N 2/143
180/331
4,730,691 A * 3/1988 Grigg .................... B60N 2/143
180/329

(Continued)

FOREIGN PATENT DOCUMENTS

DE 10 2016 226 037 A1 8/2004
EP 1 449 709 A1 8/2004
WO WO 2018/051317 A1 3/2018

OTHER PUBLICATIONS

Weiss, Panasonic's autonomous car cabin, New Atlas, Jan. 7, 2017, http://newatlas.com/panasonic-autonomous-cabin-concept/47280/, as accessed on Dec. 17, 2018.

*Primary Examiner* — Timothy Wilhelm
(74) *Attorney, Agent, or Firm* — Arent Fox LLP

(57) ABSTRACT

A vehicle includes a vehicle seating system including at least two seats individually mounted to an outer track. The vehicle seating system may include a display device selectively positionable in one of a horizontal table orientation and a vertical screen orientation. The display device mounted to at least one inner track that is at least partially enclosed by the outer track. The vehicle seating system includes a controller configured to transition the seats and the display device among at least two preconfigured arrangements.

17 Claims, 7 Drawing Sheets

(51) Int. Cl.
   *B60N 2/14*      (2006.01)
   *B60N 2/06*      (2006.01)
   *B60R 11/02*     (2006.01)
   *B62D 63/04*     (2006.01)
   *B60N 2/02*      (2006.01)
   *B60R 11/00*     (2006.01)

(52) U.S. Cl.
   CPC .......... *B60N 3/001* (2013.01); *B60R 11/0235* (2013.01); *B62D 63/04* (2013.01); *B60R 2011/0085* (2013.01)

(56) References Cited

U.S. PATENT DOCUMENTS

| | | | | |
|---|---|---|---|---|
| 5,757,158 | A * | 5/1998 | Ferguson | B60K 20/02 |
| | | | | 318/543 |
| H1831 | H * | 2/2000 | Kelley | E02F 9/2004 |
| | | | | 180/333 |
| 6,393,959 | B1 * | 5/2002 | Amemiya | E02F 3/3609 |
| | | | | 172/122 |
| 6,752,444 | B2 * | 6/2004 | Kitano | B60R 7/04 |
| | | | | 296/184.1 |
| 7,032,703 | B2 * | 4/2006 | Wulfert | B60N 2/143 |
| | | | | 180/329 |
| 7,219,961 | B2 * | 5/2007 | Priepke | B60N 2/143 |
| | | | | 296/65.06 |
| 7,441,625 | B2 * | 10/2008 | Ackermann | B60N 2/14 |
| | | | | 180/326 |
| 7,784,581 | B1 * | 8/2010 | Klas | E02F 9/166 |
| | | | | 180/329 |
| 8,403,358 | B2 * | 3/2013 | Choi | B60R 21/214 |
| | | | | 280/728.2 |
| 9,494,940 | B1 * | 11/2016 | Kentley | G05D 1/0255 |
| 9,527,456 | B2 * | 12/2016 | Ackeret | B60N 3/002 |
| 9,555,709 | B2 * | 1/2017 | Lee | B60K 35/00 |
| 9,597,983 | B2 * | 3/2017 | Strasdat | B60R 7/04 |
| 9,725,064 | B1 * | 8/2017 | Faruque | B60N 2/143 |
| 9,744,933 | B1 * | 8/2017 | Rao | B60R 21/01554 |
| 9,783,202 | B2 * | 10/2017 | Yamada | G06K 9/00845 |
| 9,862,290 | B2 * | 1/2018 | Yamada | B60N 2/012 |
| 10,023,091 | B2 | 7/2018 | Bendewald et al. | |
| 10,040,373 | B2 | 8/2018 | Rawlinson et al. | |
| 10,053,164 | B2 * | 8/2018 | Faruque | B60R 21/20 |
| 10,099,576 | B2 * | 10/2018 | Lota | B60N 2/0244 |
| 10,137,813 | B2 * | 11/2018 | Helot | B60N 2/02 |
| 10,144,381 | B2 * | 12/2018 | Faruque | B60R 22/36 |
| 10,252,693 | B2 * | 4/2019 | Numazawa | B60R 21/01554 |
| 10,279,770 | B2 * | 5/2019 | Faruque | B60R 21/214 |
| 10,343,642 | B2 * | 7/2019 | Faruque | B60R 21/232 |
| 10,471,923 | B2 * | 11/2019 | Jimenez | B60R 21/232 |
| 10,525,893 | B2 * | 1/2020 | Lind | B60N 3/102 |
| 10,589,708 | B2 * | 3/2020 | Cho | B60R 21/214 |
| 10,613,815 | B2 * | 4/2020 | Ellis | G06F 3/147 |
| 2002/0074181 | A1 * | 6/2002 | Brandt | G05G 25/02 |
| | | | | 180/315 |
| 2003/0070900 | A1 * | 4/2003 | Elwell | B64F 1/32 |
| | | | | 198/304 |
| 2003/0234550 | A1 * | 12/2003 | Brooks | B60R 11/0211 |
| | | | | 296/24.46 |
| 2006/0061122 | A1 * | 3/2006 | Billger | B66F 9/20 |
| | | | | 296/65.07 |
| 2006/0144634 | A1 * | 7/2006 | Portscheller | B60N 3/063 |
| | | | | 180/330 |
| 2009/0276122 | A1 * | 11/2009 | Demong | B62D 12/00 |
| | | | | 701/41 |
| 2010/0300796 | A1 * | 12/2010 | Ryan | B60N 2/143 |
| | | | | 180/329 |
| 2016/0152163 | A1 * | 6/2016 | Strasdat | B60N 2/24 |
| | | | | 296/64 |
| 2016/0272141 | A1 * | 9/2016 | Ohmura | B60R 21/0134 |
| 2017/0028987 | A1 * | 2/2017 | Yamada | B60N 2/062 |
| 2017/0225593 | A1 * | 8/2017 | De Saulles | B60N 2/01 |
| 2017/0259772 | A1 * | 9/2017 | Farooq | B60R 21/0136 |
| 2018/0099705 | A1 * | 4/2018 | Faruque | B62D 47/02 |
| 2018/0244175 | A1 * | 8/2018 | Tan | B62D 1/183 |
| 2019/0001841 | A1 * | 1/2019 | Vanel | B60N 2/065 |
| 2019/0196679 | A1 * | 6/2019 | You | G06F 3/0484 |
| 2019/0232786 | A1 * | 8/2019 | Sasaki | B60K 37/06 |

* cited by examiner

US 10,814,746 B2

ROTATABLE SEAT CONFIGURATION WITH MULTI-USE TABLE

TECHNICAL FIELD

The present disclosure generally relates to seating, and in particular relates to vehicle seating used in transportation.

BACKGROUND

The subject matter disclosed herein relates to vehicle seating and, more particularly, to control systems and methods for movable seating and tables.

Conventional passenger vehicles include driver-side and passenger-side front seats normally oriented facing a forward direction of travel. Vehicle seats generally include controls for adjusting the position of the seat. More advanced vehicle seats include power movement, adjustable lumbar support, adjustable side bolsters, seat and back heating, sound systems, and ventilation systems.

Passenger vehicle seating, however, is typically limited to fixed locations for each seat. For example, seats are arranged in forward facing rows. Even special purpose vehicles such as limousines typically have a fixed seating arrangement. In an autonomous vehicle, however, a fixed location for driver and/or passenger seats may not be necessary.

In view of the foregoing, a rotatable seat configuration including a multi-use table in a vehicle is provided. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides a vehicle seating system. The vehicle seating system may include at least two seats individually mounted to an outer track. The vehicle seating system may include a display device selectively positionable in one of a horizontal table orientation and a vertical screen orientation, the display device mounted to at least one inner track that is at least partially enclosed by the outer track. The vehicle seating system may include a controller configured to transition the seats and the display device among at least two preconfigured arrangements.

In another aspect, the disclosure provides a method of changing a vehicle passenger seating configuration. The method may include moving one or more seats along an outer track, each seat individually mounted to the outer track. The method may include transitioning a display device between a horizontal table orientation and a vertical screen orientation, the display device being mounted to at least one inner track that is at least partially enclosed by the outer track. The method may include moving one or more of the seats along the outer track after the display device has transitioned between orientations.

In another aspect, the disclosure provides a vehicle. The vehicle may include a motor and a plurality of wheels. At least one of the wheels may be driven by the motor. The vehicle includes a floor supported by the plurality of wheels. The vehicle may include at least three seats individually mounted to an outer track on the floor. The vehicle may include a display device selectively positionable in one of a horizontal table orientation and a vertical screen orientation. The display device may be mounted to at least one inner track that is at least partially enclosed by the outer track. The vehicle may include a controller configured to transition the seats and the display device among at least two preconfigured arrangements.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

In an aspect, the present disclosure includes a vehicle having a vehicle passenger area that is reconfigurable to meet the needs of the passengers. The vehicle passenger area may include at least two seats and a display device. The display device may be oriented in either a horizontal table configuration or a vertical screen orientation. In the horizontal table configuration, the display device may be used as a work surface, while also providing an interactive interface with the vehicle. For example, passengers may interact with each other and with the vehicle to plan a trip. Further, the display device may provide entertainment or educational programming in the horizontal orientation. For example, the display device may provide an interactive table top game for multiple players. In the screen configuration, the display device may provide entertainment or educational programming for a group of passengers, and also be used to interact with the vehicle. The seats may be individually repositionable with respect to each other and with respect to the display device. In an aspect, the seats are each mounted to an outer track that at least partially surrounds the display device, which may be mounted on an inner track.

The vehicle may include a cabin configuration component that controls the configuration of the seats and the display device. In an aspect, the passengers may select a preconfigured seating arrangement using the display device. In another aspect, the passengers may specify locations for individual seats along the track using the display device. The cabin configuration component may control each of the seats and the display device to relocate to a specified position in the preconfigured seating arrangement. The display device may be intelligently controlled to relocate to a position for optimum viewing by the seated occupants (as the occupant eye point will be known based on the selected seating position). In an aspect, due to the size of the seats and display device, the seats and/or display device may be moved in a particular order to facilitate the seating arrangement and avoid collisions. For example, the display device may transition between the horizontal table orientation and the vertical screen orientation in a manner that avoids entering a space where a passenger may be seated.

Figure 1:
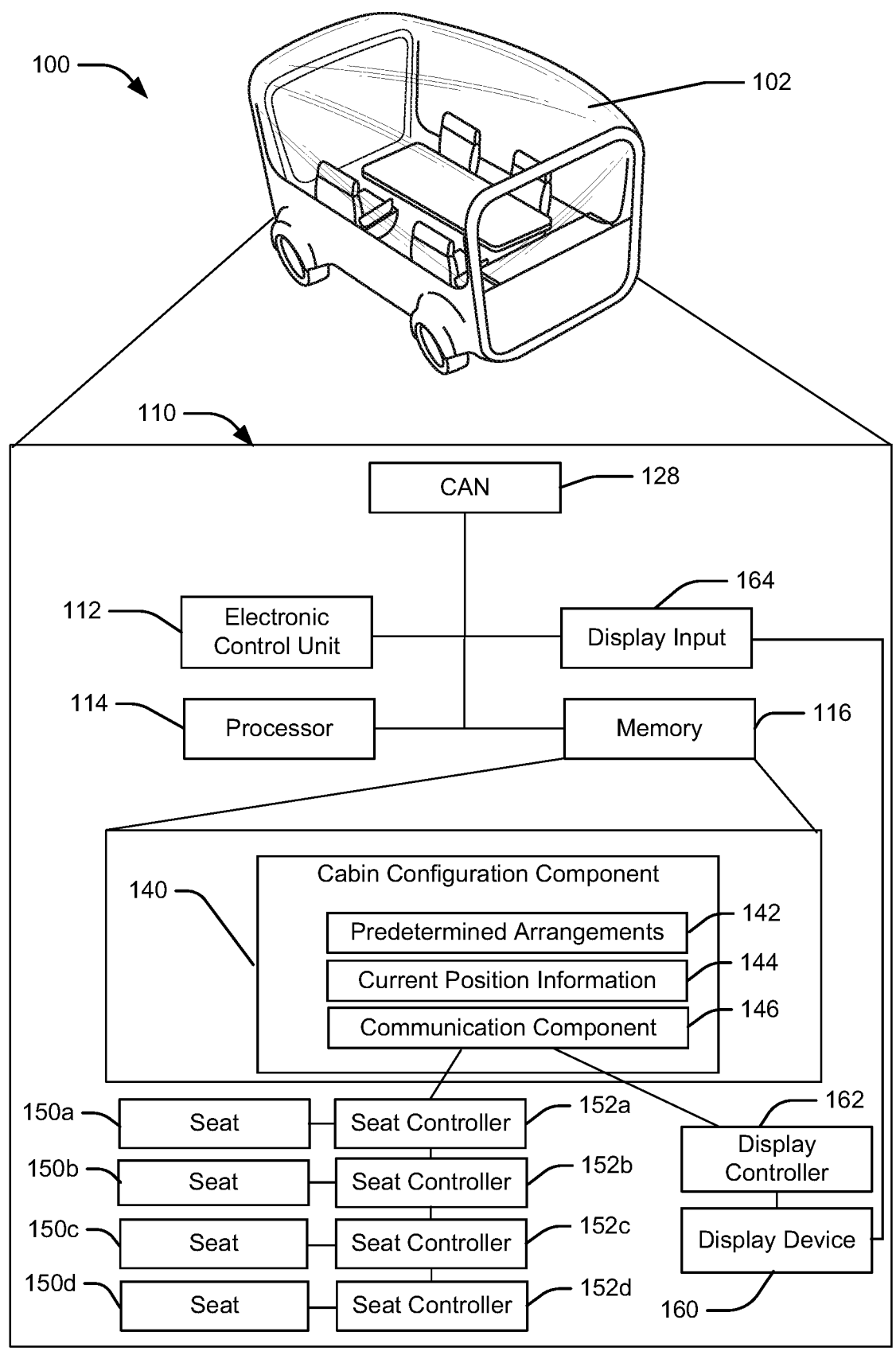
FIG. 1 illustrates a schematic view of an example operating environment of a vehicle seating system in accordance with aspects of the present disclosure.

Turning to FIG. 1, a schematic view of an example operating environment 100 of a vehicle seating control system 110 and example methods according to an aspect of the disclosure are provided. The vehicle seating control system 110 may reside within a vehicle 102. The components of the vehicle seating control system 110, as well as the components of other systems, hardware architectures, and software architectures discussed herein, may be combined, omitted or organized into various implementations.

The vehicle 102 may be a passenger vehicle. A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines. In an aspect, the vehicle 102 may be an autonomous vehicle. In some embodiments, the vehicle 102 may be a level 5 autonomous vehicle having no human driver. Accordingly, a passenger area of the vehicle 102 may include seats 150 for all vehicle passengers. As discussed in further detail below, the seats may be individually mounted to a track and may move along the track. In an aspect, the vehicle 102 may include at least two seats 150. In another aspect, the vehicle 102 may include three or more seats. The order of the seats along the track may be fixed, but the seats may be moved into various configurations as selected by the passengers. The passengers may select the configuration while the passengers are seated in the vehicle 102, and the vehicle seating system may rearrange the seats and passengers. The passengers may also remotely select a configuration (e.g., using a mobile device) and the vehicle seating system may rearrange the seats into the desired configuration prior to entry by the passengers.

Additionally, the passenger area of the vehicle 102 may include a display device 160 that may be oriented horizontally for use as a table or oriented vertically for use as a screen. The term "screen," "display screen," or "display," as used herein, can refer to a surface area upon which text, graphics and video are temporarily made to appear for human viewing. These may include, but are not limited to, eidophor, electroluminescent display ("ELD"), electronic paper, e-Ink, gyricon, light emitting diode display ("LED"), cathode ray tube ("CRT"), liquid-crystal display ("LCD"), plasma display panel ("PDP"), digital light processing ("DLP"), and the like. The display device 160 may provide a graphical user interface (GUI) to passengers of the vehicle 102. The term "graphical user interface," "GUI," or "user interface," as used herein, can refer to a type of interface that allows users to interact with electronic devices, the vehicle system, the vehicle, vehicle applications or the like, through graphical icons, visual indicators such as secondary notation, text-based, type command labels, text navigation, and the like. A user interface may also include a remote or wired controller, a touch based screen, or one or more microphones for receiving voice commands.

In another aspect, the disclosed vehicle seating system may be used in a passenger area of a traditional passenger vehicle. For example, the vehicle seating system may be utilized in the rear portion of a van or limousine and a human driver may sit in a front portion. As discussed in further detail below, the display device 160 may include a display input 164 and be used to provide instructions (e.g., a destination) to either an autonomous driving system or to a human driver (e.g., via a driver display).

The vehicle 102 may generally include an electronic control unit (ECU) 112 that operably controls a plurality of vehicle systems. The vehicle systems may include, but are not limited to, the vehicle seating control system 110, among others, including vehicle body monitoring systems, vehicle HVAC systems, vehicle audio systems, vehicle video systems, vehicle infotainment systems, vehicle telephone systems, and the like. The vehicle seating control system 110 may also include a processor 114 and a memory 116 that communicate with the ECU 112, display input 164, and controller area network (CAN) 128.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle seating control system 110. A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

The memory 116 may store instructions executable by the processor 114 for carrying out the methods described herein. A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM). A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Further, the memory 116 may store parameters for carrying out the methods described herein. For example, the memory 116 may store a cabin configuration component 140, which may include software executable by the processor 114 for operating the vehicle seating control system 110. The cabin configuration component 140 may also include predetermined arrangements 142 and current position information 144. The predetermined arrangements 142 may store one or more profiles of seating arrangements, for example, including location and orientation of each seat 150 and the display device 160. The predetermined arrangements 142 may be programmed by a manufacturer, or may be stored by a user, for example, prior to a trip. The current position information 144 may store the parameters of a current seating arrangement. For example the current position information 144 may store an identifier of a selected predetermined arrangement 142. In an aspect, a passenger may adjust the location and/or orientation of a specific seat (e.g., 150a), and the current position information 144 may store the adjusted position information. The cabin configuration component 140 may also include a communication component 146 for communicating movement instructions to seat controllers 152 and display controller 162.

The seat controllers 152 may control the location and orientation of the seats 150. Each seat controller 152a, 152b, 152c, 152d may be co-located with the corresponding seat 150a, 150b, 150c, 150d. The seat controllers 152 may, for example, receive commands from the communication component 146 of the cabin configuration component. For example, short range wireless communication protocols such as Wi-Fi or Bluetooth may be used to transmit the commands. A seat controller 152a may then execute the commands by controlling motors or actuators of the seat 150a. Similarly, the display controller 162 may be co-located with the display device 160 and wirelessly receive commands from the communication component 146. The display controller 162 may execute the commands to change the position or orientation of the display device 160.

Figure 2:
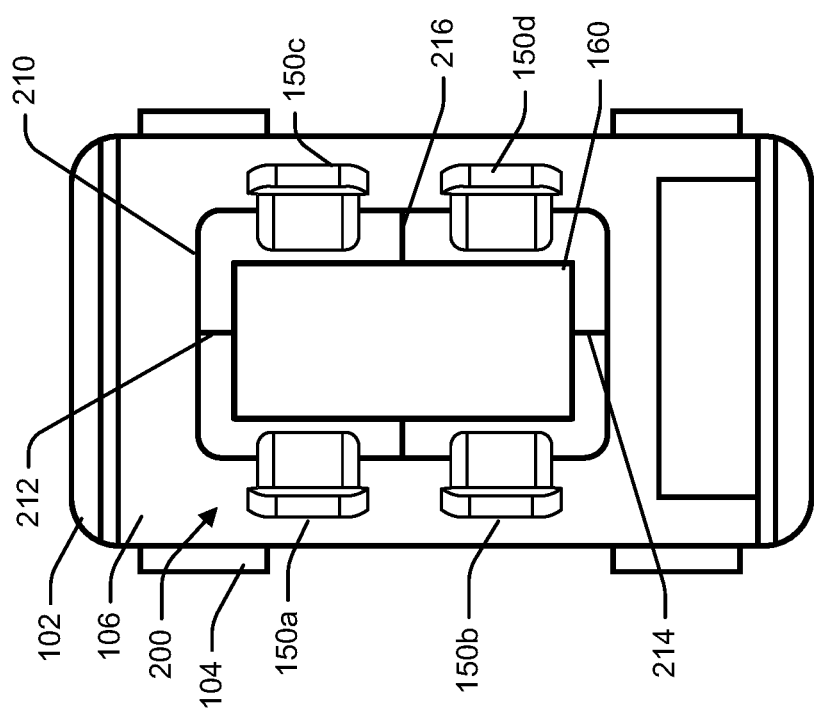
FIG. 2 illustrates a first example seating arrangement with a display in a horizontal orientation in accordance with aspects of the present disclosure.

FIG. 2 illustrates a top view of an example seating arrangement 200 that may be configured by the vehicle seating control system 110 in the vehicle 102. The vehicle 102 may include a plurality of wheels 104 that support a floor 106 (e.g., via a suspension system). In this example, the vehicle 102 includes four seats 150a, 150b, 150c, 150d, and one display device 160 mounted to the floor 106 via tracks. The seats 150 may be mounted to an outer track 210. The display device 160 may be mounted to an inner track 212, which may include a longitudinal track 214 and a lateral track 216. As illustrated, the outer track 210 may at least partially surround the inner track 212. For example, the outer track 210 may have a generally rectangular shape with rounded corners. Other example outer tracks may be provided, for example, an elliptical shape or a U-shape.

The seats 150 may be mounted to the outer track 210 in a manner that allows independent movement of each seat 150. For example, the outer track 210 may include one or more rails which are slidably received within a bracket attached to the seat 150. Each seat 150 may include multiple brackets for mounting on the outer track 210 at spaced apart locations. Each seat 150 may include a drive mechanism (e.g., a motor and worm gear) that drives the seat 150 along the outer track 210 in either direction under control of the seat controller 152. The drive mechanism may also lock the seat 150 at a location along the track when the drive mechanism is not powered to drive the seat 150. Accordingly, each seat 150 may be securely mounted in a fixed location when not actively being moved by the seat controller 152. In an aspect, the outer track 210 may be located in a recess of the floor 204 of the passenger compartment and may be covered by a flexible flap to protect against contact as passengers enter or leave the vehicle 102. The seats 150 may also include a swivel that allows the seat 150 to rotate about a vertical axis. The swivel may include a motor to power the rotation or may allow manual rotation. In an aspect, a seat 150 may move with respect to the drive mechanism. For example, a seat may move traverse to the track (e.g., either toward or away from the display device 160). Additionally, a seat 150 may raise, lower, recline, or perform other known seat adjustments.

The display device 160 may be mounted to the inner track 212 in a similar manner as the seats 150 are mounted to the outer track 210. The display device 160 may include a support that allows the display device 160 to rotate about a horizontal axis and optionally rotate about a vertical axis. For example, the support may include a horizontally mounted hinge to allow for rotation about the horizontal axis. A linear actuator may be connected between a vertical member of the support and the display device 160 to control rotation about the horizontal axis, which may be limited to 90 degrees. The support may also include concentric vertical tubes with a motor to drive one tube with respect to the other to provide 360 degree rotation about the vertical axis. In an aspect, the display device 160 has a relatively narrow thickness (e.g., less than 10 cm), a width, and a length. An aspect ratio of the length to width may be similar to conventional video displays (e.g., 5:4, 4:3, 16:10, or 16:9). The length of the display device 160 may be greater than a width of a seat 150. For example, the length may be sufficient for at least two seats to be positioned along a side of the display device 160. In another aspect, the length of the display device 160 may be related to a width of the vehicle 102 or a passenger area thereof. For example, as described in further detail below, the display device 160 may be used to divide the passenger area. Therefore, the length of the display device 160 may be at least 80% of a width of the passenger area, or greater than 90% of the width of the passenger area. In an aspect, the display device 160 may temporarily change shapes (e.g., by folding or separating into smaller panels) to facilitate movement or orientation of the display device 160.

The seating arrangement 200 may include the display device 160 located at a central location and the seats 150 positioned along the two long edges of the display device 160. Accordingly, the display device 160 may be used as a table. For example, the display device 160 may support objects of the passengers. The display device 160 may also be used as an interactive work surface in the horizontal orientation. For example, the display device 160 may provide information about a trip and/or allow passengers to make decisions about the trip. For example, the display device 160 may display a map with locations of restaurants and the passengers may obtain further information about the restaurants and select a destination. The positioning of the seats 150 around the display device 160 may promote communication and collaborative decision making among passengers.

Figure 3:
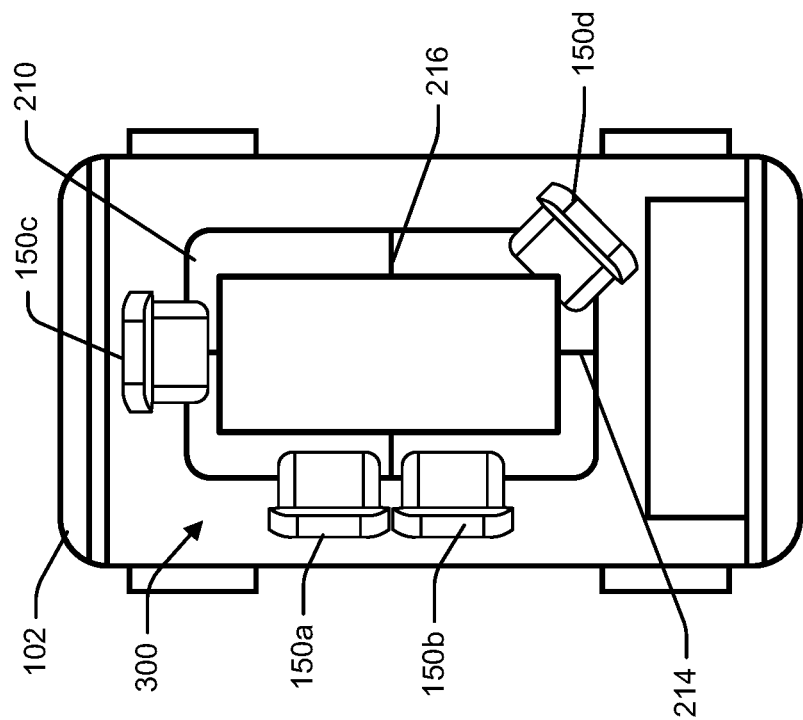
FIG. 3 illustrates a second example seating arrangement with a display in a horizontal orientation in accordance with aspects of the present disclosure.

FIG. 3 illustrates a top view of another example seating arrangement 300. The seating arrangement 300 may be similar to the seating arrangement 200 with the display device 160 in the horizontal table orientation. In the seating arrangement 300 one of the seats 150*c* may be located on the outer track 210 at an end of the display device 160. As another example, a seat 150*d* may be located on the outer track 210 at a corner of the display device 160. The seats 150 may be moved to various positions around the display device 160 while the display device 160 is in the horizontal table orientation. For example, the seats 150*a*, 150*b*, may be spaced from the display device 160 such that a forward edge of the seat is approximately aligned with the side of the display device 160. A portion of a seat 150*d* may also be positioned under an edge of the display device 160, for example, when the seat 150*d* is located at a corner of the display device 160.

Figure 4:
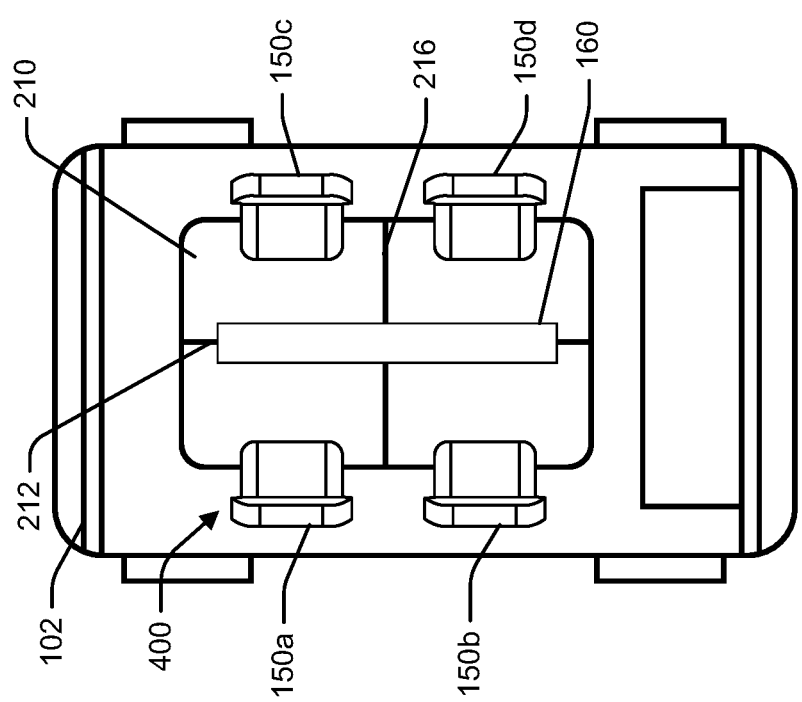
FIG. 4 illustrates a third example seating arrangement with a display in a vertical orientation in accordance with aspects of the present disclosure.

FIG. 4 illustrates a top view of another example seating arrangement 400 in which the display device 160 may be in a vertical screen orientation. In the vertical screen orientation, the display device 160 may be oriented with the surface of the display device in a substantially vertical plane. As such the display device 160 may be suitable for displaying entertainment or educational programming to be viewed by one or more passengers in the seats 150. The angle of the display device 160 with respect to a floor of the vehicle 102 may be adjustable within a range of, for example, 20 degrees. Accordingly, the display device 160 may be oriented to ease viewing and/or reduce glare from internal or external light sources. The display device 160 may also be used as an input device (e.g., via display input 164). As illustrated, two of the seats 150*a*, 150*b* may be facing a front of the display device 160 and the other two seats 150*c*, 150*d* may be facing a back of the display device 160.

Figure 5:
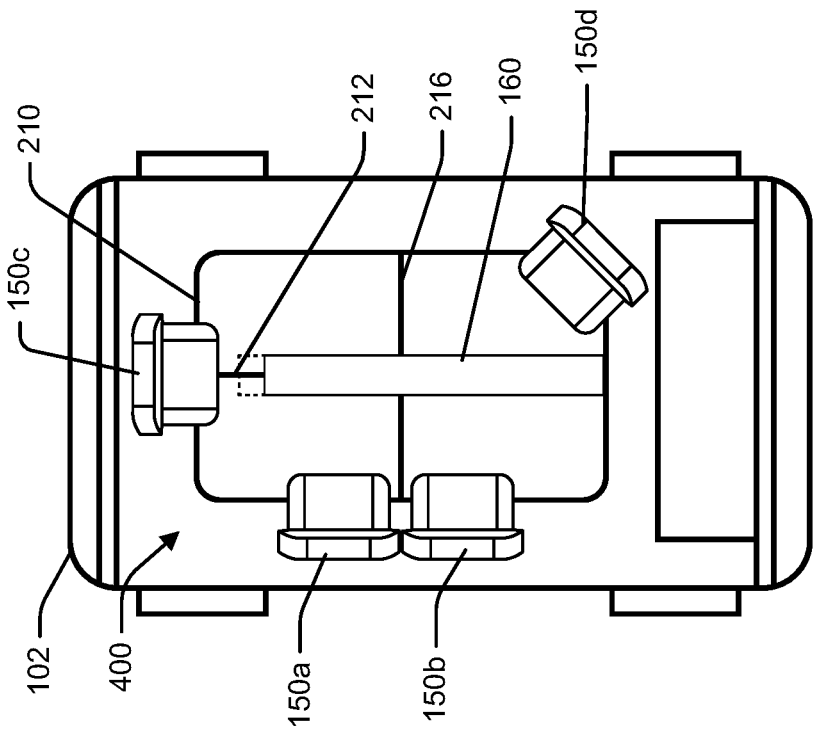
FIG. 5 illustrates a fourth example seating arrangement with a display in a vertical orientation in accordance with aspects of the present disclosure.

FIG. 5 illustrates a top view of another example seating arrangement 500 in which the display device 160 may be in a vertical screen orientation. The seats 150 may be moved along the outer track 210 around the display device 160. In an aspect, the display device 160 may interfere with the movement of a seat 150*c* when in the vertical screen orientation because the seat 150*c* may be unable to pass under the display device 160 in the vertical orientation. In an aspect, the display device 160 may be moved along the inner track 212 to provide space for the seat 150*c* to pass on the outer track 210.

Figure 6:
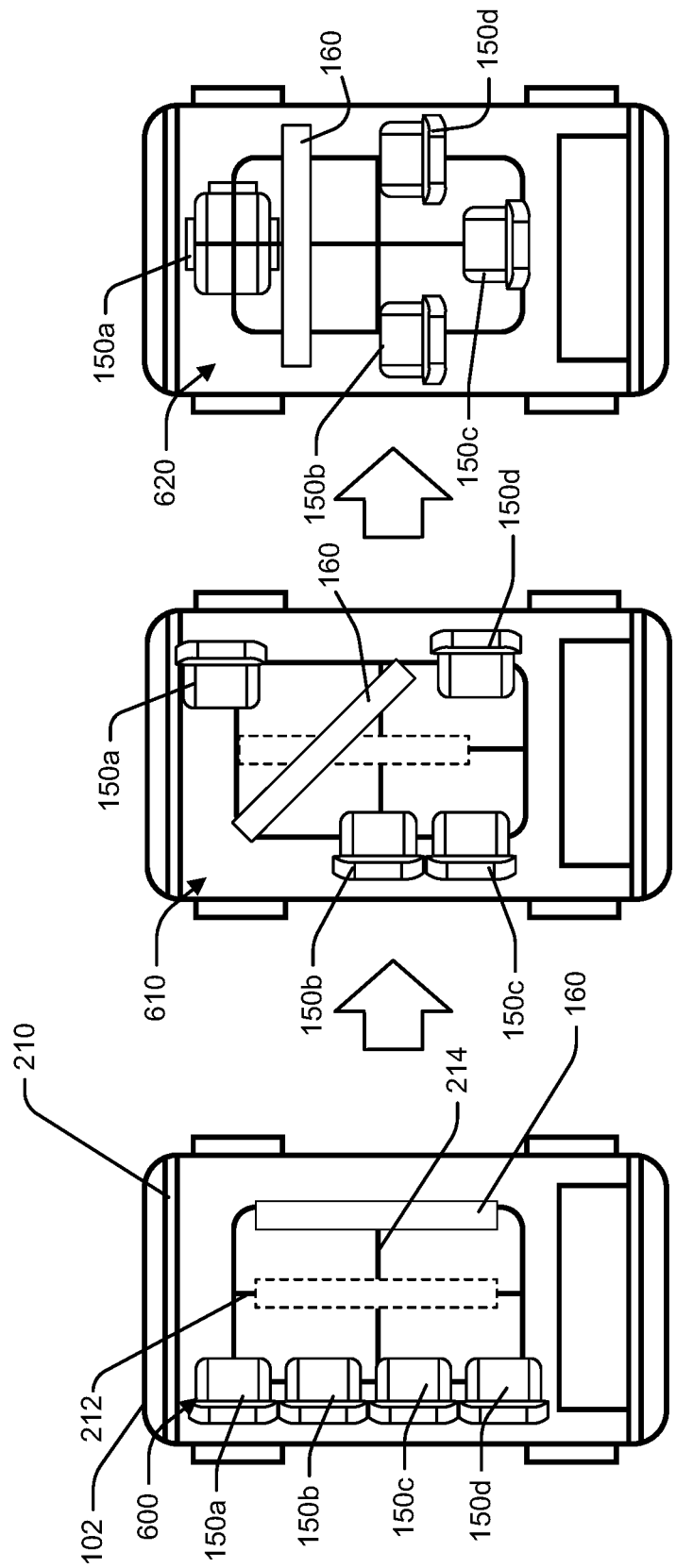
FIG. 6 illustrates an example sequence for transitioning between seating arrangements in accordance with aspects of the present disclosure.

FIG. 6 illustrates a series of seating arrangements, 600, 610, 620 that may be used to alter the cabin of a vehicle to accommodate the needs of passengers. In the seating arrangement 600, the seats 150 may be located along one side of the outer track 210. The display device 160 may be oriented in the vertical screen orientation and positioned at a center of the passenger area on the inner track 212. In an aspect, the display device 160 may be moved along a lateral track 216 of the inner track 212 to position the display device 160 further away from the seats 150, for example, to improve viewing angles of the display device 160 for the passengers. In another aspect, the display device 160 may be rotated to face outward through a window of the vehicle. In an outward facing orientation, the display device may be used as a billboard, outdoor television, inter-vehicle communication system, or part of a larger arrangement including multiple vehicles.

In an aspect, one or more passengers may not desire to view the display device 160. For example, a passenger may wish to recline the seat 150*a* and sleep. The seating arrangement 610 may be an intermediary arrangement to facilitate a transition to the seating arrangement 620 in which one of the seats 150*a* is able to recline. In the seating arrangement 620, the display device 160 may be moved forward along the inner track 212 to allow two of the seats 150*a*, 150*d* to be moved to an opposite side of the outer track 210 behind the display device 160. In an aspect, the seats 150*a*, 150*d* may be positioned near the corners of the outer track 210. The display device 160 may then be rotated about a vertical axis such that the length of the display device 160 extends laterally across the passenger area. The position of the seats 150 may allow such rotation without contacting the seats 150 or a passenger.

In the seating arrangement 620, one of the seats 150*a* may be positioned behind the display device 160 and may be reclined. The display device 160 may serve as a divider to isolate the reclined seat 150*a*. The other seats 150*b*, 150*c*, 150*d* may be positioned in front of and facing the display device 160. The seats 150 may be spaced along the outer track 210 to maximize space for each passenger. In an aspect, the seats 150 that are facing the display device 160 may be fully or partially reclined.

Figure 7:
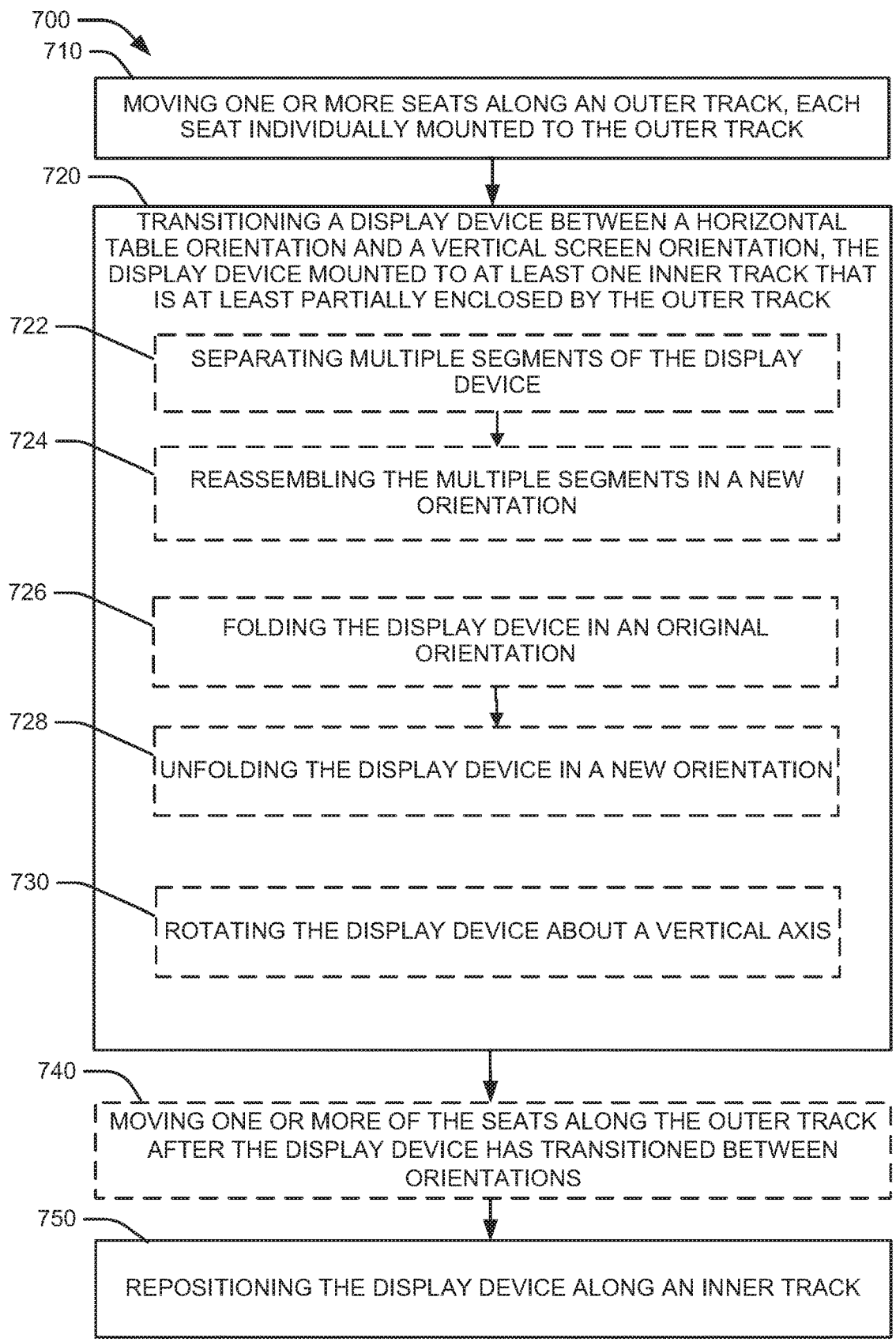
FIG. 7 is a flowchart of an example method of controlling a seating arrangement of vehicle in accordance with aspects of the present disclosure.

FIG. 7 illustrates a flowchart of an example method 700 for controlling a vehicle seating arrangement. The method 700 may be performed by a cabin configuration component 140 in communication with other components of the vehicle seating control system 110 within a vehicle 102.

In block 710, the method 700 may include moving one or more seats along an outer track, each seat individually mounted to the outer track. In an aspect, for example, the cabin configuration component 140 and/or the processor 114 may move one or more of seats 150 along the outer track 210. As discussed above, each of the seats 150 may be mounted to the outer track 210. The cabin configuration component 140 may move the seats 150 according to a selected predetermined arrangement 142. In an aspect, the cabin configuration component 140 may transmit commands to the seat controller 152 corresponding to each of the one or more seats 150 via the communication component 146. Each seat controller 152 may respond to the commands by driving a motor in the correct direction to move the seat 150 along the outer track 210. In an aspect, the movement in block 710 may move each of the seats 150 to a location that does not obstruct movement of the display device 160. For example, the seats 150 may be moved to a long edge of the outer track 210. Additionally, the seats 150 may be moved transverse to the track and away from the table, for example, via an internal adjustment between a seat body and a seat base mounted to the track.

In block 720, the method 700 may include transitioning a display device between a horizontal table orientation and a vertical screen orientation. In an aspect, for example, the cabin configuration component 140 and/or the processor 114 may transition the display device 160 between a horizontal table orientation and a vertical screen orientation. As discussed above, the display device 160 may be mounted to at least one inner track 212 that is at least partially enclosed by the outer track 210. In an aspect, the cabin configuration component 140 may send commands to the display controller 162 via the communication component 146. The display controller 162 may control one or more motors or actuators of the display device 160 to transition the display device 160 between the horizontal table orientation and the vertical screen orientation. For example, the display controller 162 may drive a motor that rotates the display device 160 around a pivot point.

In an aspect, the display controller 162 may control a transition operation that reduces the spaces needed to change the orientation of the display device 160. For example, at block 722, the block 720 may include separating multiple segments of the display device. The display controller 162 may, for example, power linear actuators (e.g., solenoids) that separate multiple segments of the display device. The display controller 162 may move the segments individually. At block 724, the block 720 may include reassembling the multiple segments in a new orientation. For example, the display controller 162 may depower the linear actuators to reassemble the multiple segments.

As another example, in block 726, the block 720 may include folding the display device in an original orientation. In an aspect, for example, the display device 160 may be a foldable display and the display controller 162 may bend or fold the display device 160 to reduce the area of the display device 160. The display device 160 may remain in the folded state during a transition and until desired for use. At block 728, the block 720 may include unfolding the display device in a new orientation. For example, the display controller 162 may unfold the display device 160 in the new orientation.

In another aspect, transitioning the display device between a horizontal table orientation and the vertical screen orientation may include, at block 730, rotating the display device about a vertical axis. For example, the display controller 162 may rotate the display device about the vertical axis. For instance, the display device 160 may be oriented to face the seats 150 when the display device 160 is in a vertical screen orientation.

At block 740, the method 700 may include moving one or more of the seats along the outer track after the display device has transitioned between orientations. In an aspect, for example, the cabin configuration component 140 and/or the processor 114 may move one or more of seats 150 along the outer track 210 after the display device 160 has transitioned between orientations. For example, the cabin configuration component 140 may send commands to one or more of the seat controllers 152 to move the one or more seats 150 along the outer track 210. For instance, as illustrated in FIG. 6, the seats 150 may be moved to face the display device 160 with each seat 150 having an unobstructed view of the display device 160.

In block 750, the method 700 may optionally include repositioning the display device along an inner track. In an aspect, for example, the cabin configuration component 140 and/or the processor 114 may reposition the display device 160 along the inner track 212. For example, the cabin configuration component 140 may send commands to the display controller 162 to move the display device 160 along the inner track 212, for example, by driving a worm gear that move the display device in the desired direction according to the selected predetermined arrangement 142.

Figure 8:
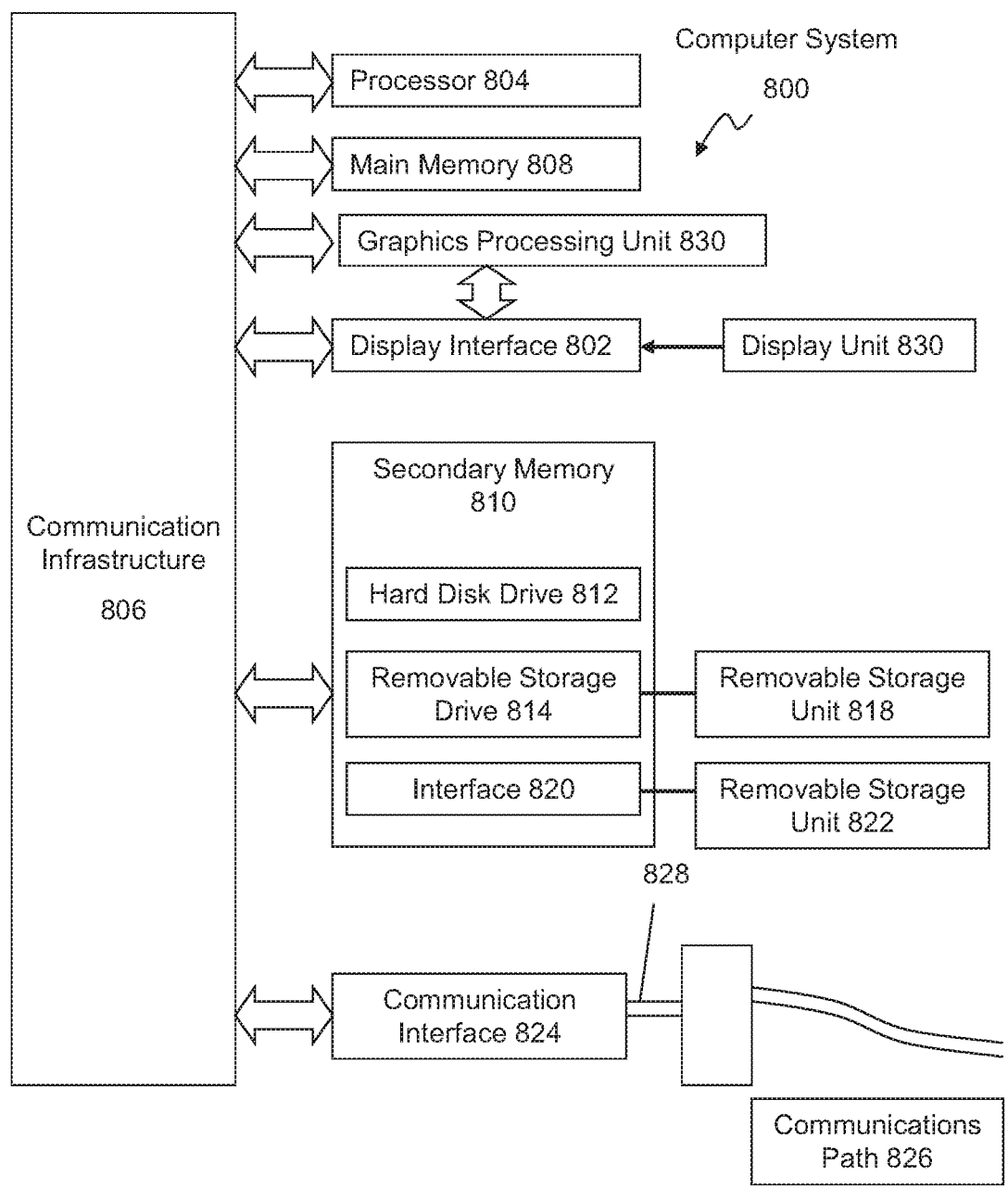
FIG. 8 presents an exemplary system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. For example, the computer system may implement the cabin configuration component 140. FIG. 8 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 800 is shown in FIG. 8.

Computer system 800 includes one or more processors, such as processor 804. The processor 804 is connected to a communication infrastructure 806 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 800 may include a display interface 802 that forwards graphics, text, and other data from the communication infrastructure 806 (or from a frame buffer not shown) for display on a display unit 830. In an aspect, the display unit 830 may correspond to the display device 160. Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc., which is read by and written to removable storage drive 814. As will be appreciated, the removable storage unit 818 includes a computer usable storage medium having stored therein computer software and/or data.

In alternative aspects, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828, which may be electronic, electromagnetic, optical or other signals capable of being received by communications interface 824. These signals 828 are provided to communications interface 824 via a communications path (e.g., channel) 826. This path 826 carries signals 828 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 880, a hard disk installed in hard disk drive 870, and signals 828. These computer program products provide software to the computer system 800. Aspects of the disclosure are directed to such computer program products.

Computer programs (also referred to as computer control logic) are stored in main memory 808 and/or secondary memory 810. Computer programs may also be received via communications interface 824. Such computer programs, when executed, enable the computer system 800 to perform various features in accordance with aspects of the present disclosure, as discussed herein. In particular, the computer programs, when executed, enable the processor 804 to perform such features. Accordingly, such computer programs represent controllers of the computer system 800.

In variations where aspects of the disclosure are implemented using software, the software may be stored in a computer program product and loaded into computer system 800 using removable storage drive 814, hard disk drive 812, or communications interface 820. The control logic (software), when executed by the processor 804, causes the processor 804 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 9:
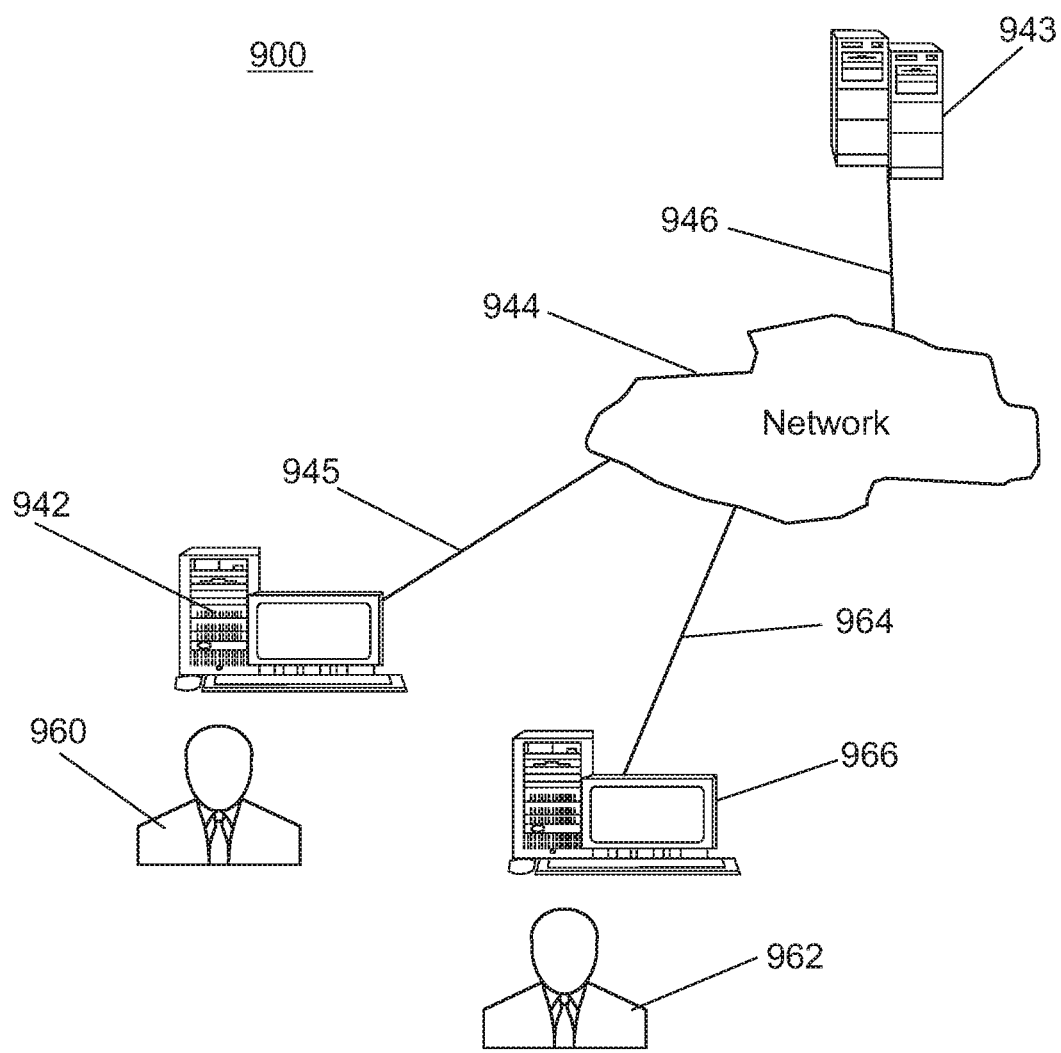
FIG. 9 is a block diagram of various exemplary system components for use in accordance with aspects of the present disclosure.

FIG. 9 is a block diagram of various example system components that may be used in accordance with aspects of the present disclosure. For example, the various components may be within the vehicle 102, or only some of the components may be within the vehicle 102, and other components may be remote from the vehicle 102. The system 900 includes one or more accessors 960, 962 (also referred to interchangeably herein as one or more "users") and one or more terminals 942, 966 (such terminals may be or include, for example, various features of the vehicle seating control system 110). In one aspect, data for use in accordance with aspects of the present disclosure is, for example, input and/or accessed by accessors 960, 962 via terminals 942, 966, such as personal computers (PCs), minicomputers, mainframe computers, microcomputers, telephonic devices, or wireless devices, such as personal digital assistants ("PDAs") or a hand-held wireless devices coupled to a server 943, such as a PC, minicomputer, mainframe computer, microcomputer, or other device having a processor and a repository for data and/or connection to a repository for data, via, for example, a network 944, such as the Internet or an intranet, and couplings 945, 946, 964. The couplings 945, 946, 964 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A vehicle seating system, comprising:
    at least two seats individually mounted to an outer track;
    a display device selectively positionable in one of a horizontal table orientation and a vertical screen orientation, the display device being mounted to at least one inner track that is at least partially enclosed by the outer track, wherein the at least one inner track includes a longitudinal line extending parallel to a longitudinal axis of the vehicle and a lateral line extending perpendicular to the longitudinal line; and
    a controller configured to transition the seats and the display device among at least two preconfigured arrangements.

2. The vehicle seating system of claim 1, wherein the outer track has a rounded rectangular shape and forms a closed circuit enclosing the inner track.

3. The vehicle seating system of claim 1, wherein the display device, when in the vertical orientation, is rotatable about a vertical axis.

4. The vehicle seating system of claim 1, wherein the display device includes multiple segments that separate while transitioning between the horizontal table orientation and the vertical screen orientation.

5. The vehicle seating system of claim 1, wherein the display device is a foldable display that folds before transitioning between orientations and unfolds after the change is completed.

6. The vehicle seating system of claim 1, wherein the vehicle seats are moved transverse to the outer track when the display device transitions between the horizontal table orientation and the vertical screen orientation.

7. The vehicle seating system of claim 1, wherein the display device presents a user interface providing a selection among the preconfigured arrangements.

8. The vehicle seating system of claim 1, wherein the preconfigured arrangements include an arrangement with the display device in the horizontal table orientation and the seats arranged on at least two opposing sides of the display device.

9. The vehicle seating system of claim 1, wherein the preconfigured arrangements include an arrangement with the display device in the vertical screen orientation and all of the seats facing the display device.

10. The vehicle seating system of claim 1, wherein the preconfigured arrangements include an arrangement with the display device in the vertical screen orientation extending transverse to the inner track and segmenting a passenger area with at least one seat facing the display device and at least one seat behind the display device.

11. A method of changing a vehicle passenger seating configuration, comprising:
    moving one or more seats along an outer track, each seat individually mounted to the outer track;
    transitioning a display device between a horizontal table orientation and a vertical screen orientation, the display device being mounted to at least one inner track that is at least partially enclosed by the outer track;
    repositioning the display device along the at least one inner track, wherein the at least one inner track includes a longitudinal line extending parallel to a longitudinal axis of the vehicle and a lateral line extending perpendicular to the longitudinal line; and moving one or more of the seats along the outer track after the display device has transitioned between orientations.

12. The method of claim 11, wherein transitioning the display device comprises rotating the display device about a vertical axis.

13. The method of claim 11, wherein transitioning the display device comprises:
    separating multiple segments of the display device; and
    reassembling the multiple segments in a new orientation.

14. The method of claim 11, wherein transitioning the display device comprises:
    folding the display device in an original orientation; and
    unfolding the display device in a new orientation.

15. A vehicle comprising:
    a motor;
    a plurality of wheels, at least one of the wheels driven by the motor;
    a floor supported by the plurality of wheels;
    at least two seats individually mounted to an outer track on the floor;
    a display device selectively positionable in one of a horizontal table orientation and a vertical screen orientation, the display device being mounted to at least one inner track that is at least partially enclosed by the outer track, wherein the at least one inner track includes a longitudinal line extending parallel to a longitudinal axis of the vehicle and a lateral line extending perpendicular to the longitudinal line;
    a controller configured to transition the seats and the display device among at least two preconfigured arrangements.

16. The vehicle of claim 15, wherein the outer track has a rounded rectangular shape and forms a closed circuit enclosing the inner track.

17. The vehicle of claim 15, wherein the display device, when in the vertical orientation, is rotatable about a vertical axis.

* * * * *